US006458449B1

(12) United States Patent
Parent et al.

(10) Patent No.: US 6,458,449 B1
(45) Date of Patent: Oct. 1, 2002

(54) INKJET PRINTABLE HOLOGRAPHIC PAPER

(75) Inventors: Kyle R. Parent, Holyoke; Timothy R. McDonald, Easthampton; Earl C. Spice, Granby; John H. Hazen, Southampton, all of MA (US)

(73) Assignee: Hazen Paper Company, Holyoke, MA (US)

( * ) Notice: Subject to any disclaimer, the term of this patent is extended or adjusted under 35 U.S.C. 154(b) by 0 days.

(21) Appl. No.: 09/396,290

(22) Filed: Sep. 15, 1999

(51) Int. Cl.[7] ................................................ B32B 3/00
(52) U.S. Cl. .................................... 428/195; 428/304.4
(58) Field of Search .............................. 428/195, 304.4; 426/913, 913.3, 911

(56) References Cited

U.S. PATENT DOCUMENTS

| | | | | |
|---|---|---|---|---|
| 4,701,837 A | | 10/1987 | Sakaki et al. | 346/135.1 |
| 4,756,961 A | | 7/1988 | Mouri et al. | 428/323 |
| 4,801,497 A | | 1/1989 | Kono et al. | 428/332 |
| 5,132,146 A | | 7/1992 | Maruyama et al. | 427/261 |
| 5,270,103 A | | 12/1993 | Oliver et al. | 428/219 |
| 5,429,860 A | | 7/1995 | Held et al. | 428/195 |
| 5,494,759 A | | 2/1996 | Williams et al. | 428/514 |
| 5,523,149 A | | 6/1996 | Kijumuta et al. | 428/307.3 |
| 5,569,529 A | | 10/1996 | Becker et al. | 428/331 |
| 5,570,120 A | | 10/1996 | Sakaki et al. | 347/105 |
| 5,662,997 A | * | 9/1997 | Onishi et al. | 428/331 |
| 5,683,793 A | | 11/1997 | Malhotra et al. | 428/216 |
| 5,693,410 A | | 12/1997 | Malhotra et al. | 428/216 |
| 5,714,245 A | | 2/1998 | Atherton et al. | 428/323 |
| 5,764,262 A | | 6/1998 | Wu et al. | 347/101 |
| 5,851,654 A | | 12/1998 | Yoshino et al. | 428/328 |
| 5,869,177 A | | 2/1999 | Yoshino et al. | 428/328 |
| 5,958,564 A | * | 9/1999 | Iwamoto et al. | 428/212 |
| 6,139,940 A | * | 10/2000 | Iwamoto et al. | 428/195 |

FOREIGN PATENT DOCUMENTS

| | | | | |
|---|---|---|---|---|
| JP | 09229752 | * | 8/1997 | B41M/5/00 |

* cited by examiner

*Primary Examiner*—Bruce H. Hess
*Assistant Examiner*—Michael E. Grendzynski
(74) *Attorney, Agent, or Firm*—McCormick, Paulding & Huber LLP

(57) ABSTRACT

An ink jet printable coating for holographic paper is presented. The coating utilizes a high dyne primer layer and a secondary layer. The secondary layer includes a plurality of microscopic pores which are preferably 1 to 6 microns in diameter. The pores are sized to allow ink jet ink to penetrate during the printing process. The coating is compatible to both water based and solvent based inks. The pores serve to provide a site to which the ink jet ink can anchor and set, thus preventing the ink from running when initially applied to the surface and speeding the rate of ink drying. Additionally, the secondary layer is porous enough to absorb the ink as it dries. The deeper the secondary layer, the further to ink can penetrate for greater adhesion to the surface and for faster drying.

20 Claims, 2 Drawing Sheets

INKJET PRINTABLE HOLOGRAPHIC PAPER

FIELD OF THE INVENTION

The present invention relates generally to a coating for a substrate. More specifically, the present invention relates to an ink jet printable coating and coating system for holographic paper.

BACKGROUND OF THE INVENTION

Holographic paper, i.e., paper having a three dimensional variable image, and diffraction paper, i.e., paper having a two dimensional variable image, are widely available on the market today. The holographic and/or diffraction (holographic) paper is known as an optically variable device, i.e., the image appearance varies depending on the light source, light angle and the viewing angle. The imagery itself is reproduced on the surface of the paper, or other substrate, from an original holographic master by micro-embossing into a coating on the surface of the paper. The surface is then vacuum metallized to provide a very bright, shiny, metallic finish that brings out the holographic imagery and makes it visible. Holographic paper is printed upon commercially using special inks that dry by oxidation and/or ultra violet curing. Additionally, some commercial operations use inks that dry by removal of solvents or water.

Ink jet printing on decorative paper has a great deal of appeal in the desk top computer publishing market, because it is interactive and has an eye-catching appearance. Greeting cards, presentation folders, business cards, labels, tags, placards, stationery, artworks, etc., are digitally printed in the office and at home on ink jet printers in wide spread use today. Ink jet printing uses water based or solvent based ink jet inks.

Problematically, holographic paper is not readily compatible with water based ink jet inks. That is, because the surface of the holographic paper is not absorptive and is nearly inert, it is difficult for the water based ink jet inks to adhere or penetrate the surface.

Solvent based ink jet inks are more readily compatible with holographic paper. However, the solvents, e.g., ethyl acetate, methyl keytone and acetone, that comprise the solvent based inks are hazardous to the environment and often require special handling. Therefore water based ink jet inks, which are not as compatible with holographic papers, are much more widely used in the desk top computer publishing market.

There is a need, therefore, for an improved method and apparatus for ink jet printing on holographic paper.

BRIEF SUMMARY OF THE INVENTION

This invention offers advantages and alternatives over the prior art by providing an ink jet printable coating for holographic paper. The coating utilizes a primer layer, preferably having a surface tension in the range of 35–80 dynes, and a secondary layer. The secondary layer includes a plurality of microscopic pores which are preferably 1 to 6 microns in diameter. The pores are sized to allow ink jet ink to penetrate during the printing process. Advantageously, the coating is compatible to both water based and solvent based inks. The pores serve to provide a site to which the ink jet ink can anchor and set, thus preventing the ink from running when initially applied to the surface. Furthermore, the pores actually create more surface area for the water to be absorbed into. Additionally, the secondary layer is porous enough to absorb the ink as it dries. The deeper the secondary layer, the further the ink can penetrate for greater adhesion to the surface.

In an exemplary embodiment of the invention, a coating is disposed on an optically variable device, e.g., holographic paper, which has an image with a variable appearance through the coating. The coating comprises a primer layer which includes a member selected from the group consisting of acrylic resins, polyester resins, urethane resins, vinyl resins and nitrocellulose. The primer layer is disposed on the surface of the optically variable device. The coating also comprises at least one secondary layer which includes a member selected from the group consisting of polyvinyl alcohol, gelatin, cellulose, acrylic resins and polyvinyl propylene. The secondary layer is disposed on the primer layer. The secondary layer has a plurality of microscopic pores disposed therein for receiving ink jet ink.

In an alternative exemplary embodiment of the invention, a method of coating an optically variable device having an image with a variable appearance through the coating is presented. The method comprises first coating the optically variable device with a primer layer including a member selected from the group consisting of acrylic resins, polyester resins, urethane resins, vinyl resins and nitrocellulose. Next, the method comprises coating at least one secondary layer including a member selected from the group consisting of polyvinyl alcohol, gelatin, cellulose, acrylic resins and polyvinyl propylene on the primer layer, via the coating process known as rotogravure. Thus, the method forms a plurality of microscopic pores on the secondary layer for receiving ink jet ink.

BRIEF DESCRIPTION OF THE DRAWINGS

Referring now to the drawings wherein like elements are numbered alike in the several Figures.

DETAILED DESCRIPTION OF THE INVENTION

Figure 1:
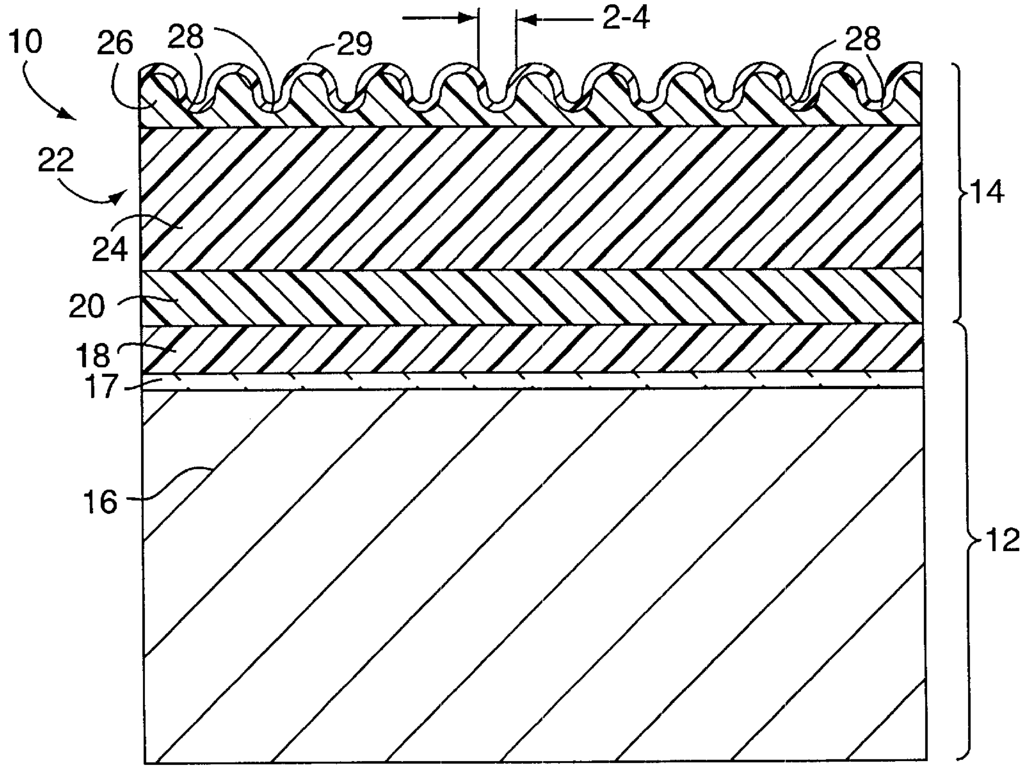
FIG. 1 is a side view of an exemplary embodiment of a coating in accordance with the present invention.
Figure 2:
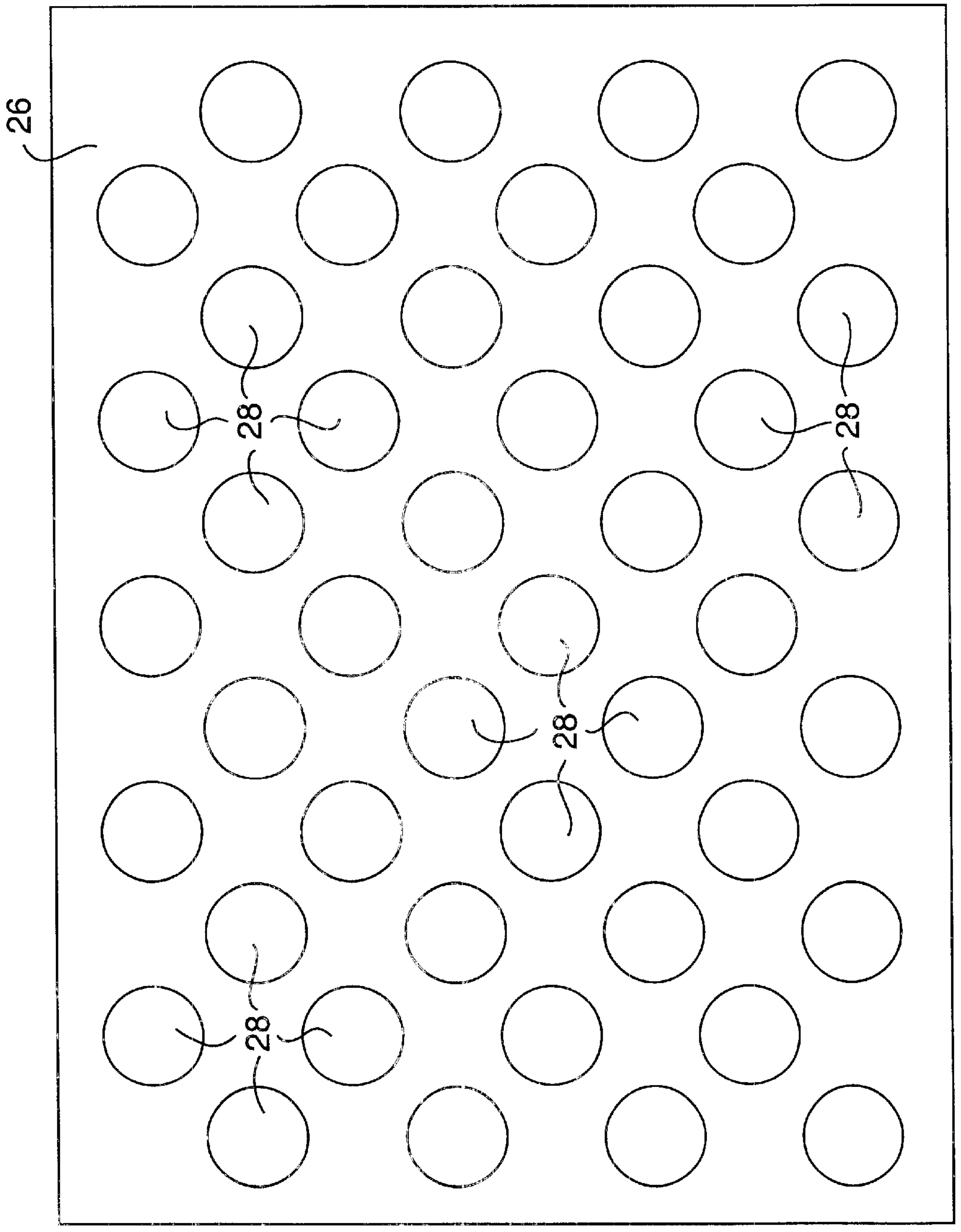
FIG. 2 is a top view of the coating of FIG. 1.

Referring to FIGS. 1 and 2, an exemplary embodiment of holographic paper 12 having an ink jet printable coating 14 disposed thereon is shown generally at 10. The holographic paper 12 comprises a paper substrate 16, a clay layer 17 and an optically variable image portion 18. Although the holographic paper is shown having a paper substrate 16, it will be clear to one skilled in the art that other forms of substrate may be used, e.g., plastic or metal. The clay layer 17 is disposed on the paper substrate 16 to provide a smoother surface for the image portion 18. The optically variable image portion 18 comprises an image coating, e.g., acrylic or vinyl, into which the holographic image is micro-embossed. Although the optically variable image portion 18 is described as having a holographic image, i.e., paper having a three-dimensional variable image, it will be clear to one skilled in the art that a diffraction image, i.e., paper having a two-dimensional variable image can also be used. The holographic paper 12 is known as an "optically variable device", i.e., the image appearance varies depending on the light source, light angle and the viewing angle.

The holographic image itself is reproduced on the surface of the image portion 18 from an original holographic master (not shown) by micro-embossing into the image coating. The surface of the image portion 18 is then vacuum metallized, e.g., with aluminum, to provide a very bright, shiny, metallic finish that brings out the holographic image and makes it visible.

The ink jet printable coating 14 comprises an acrylic primer layer 20 and a polyvinyl alcohol secondary layer 22. The acrylic primer layer 20 preferably has a surface tension of at least 40 dyne, e.g., High Dyne Acrylic™, manufactured by Hazen Paper Co., of Holyoke, Mass., to facilitate a smooth laydown of the secondary layer 22. Although this embodiment shows the primer layer consisting of an acrylic, it will be clear to one skilled in the art that several other materials could also be used as the primer layer, e.g., polyester resins, urethane resins, vinyl resins and nitrocellulose.

The polyvinyl alcohol secondary layer 22 further comprises a relatively thick base coat 24 and a porous coat 26. Although the base coat is shown as a single layer it will be clear to one skilled in the art that a plurality of layers may be used. Additionally, layer 24 may further comprise an additive, e.g., a zirconium crosslinking agent, to improve adhesion of the base coat layer 24 to the primer layer 20 of the holographic paper 12. The porous coat 26 has a plurality of microscopic pores 28 disposed therein.

The microscopic pores 28 are preferably within the range of 1 to 6 microns in diameter. As will be more fully explained hereinafter, the pores are formed into porous layer 26 via the coating process known as "rotogravure". The pores 28 are sized to allow water based or solvent based ink jet inks to penetrate therein during an ink jet printing process. The pores serve to provide a site to which the ink jet ink can anchor and set, thus preventing the ink from running when initially applied to the surface of the porous layer 26. Additionally, the polyvinyl alcohol of the base coat layer 24 is porous enough to absorb the ink as it dries. The deeper the base coat layer 24, the further the ink can penetrate for greater adhesion to the surface and the faster the ink dries. Although the secondary layer 22, i.e., base coat 24 and porous coat 26, is shown as being comprised of polyvinyl alcohol, it will be clear to one skilled in the art that other materials may also be used, e.g., gelatin, cellulose, acrylic resins and polyvinyl propylene.

In an alternative embodiment of the invention, a relatively thin cap layer 29, which is resistive to absorbing moisture, is disposed on the porous layer 26. The cap layer reduces the risk of the ink jet ink smearing when exposed to various forms of precipitation, such as rain. Yet, the cap layer 29 remains porous enough to allow water based or solvent based ink jet inks to penetrate while drying. The cap layer is comprised of materials such as acrylic, vinyl, polyester, urethane and nitrocellulose.

Figure 3:
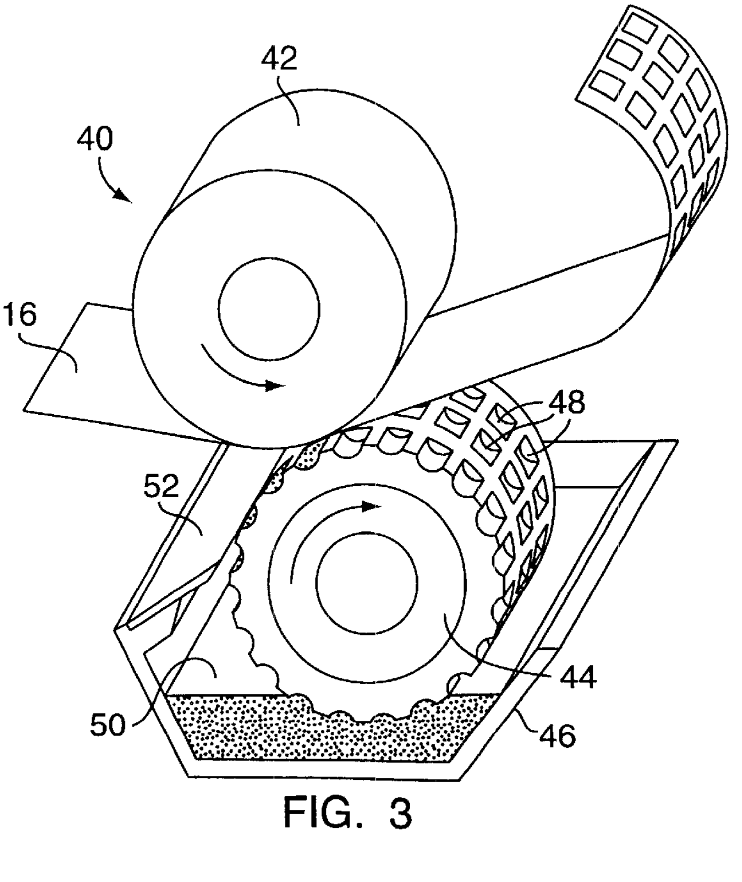
FIG. 3 is a schematic diagram of a rotogravure coating station in accordance with the present invention.

Referring to FIG. 3, an exemplary embodiment of a rotogravure coating station 40 used to apply the primer layer 20, base coat layer 24 and porous layer 26 is shown. The rotogravure coating station 40 comprises an impression cylinder 42, a coating cylinder 44 and a coating bath 46. The coating cylinder 44 is comprised of cells 48 etched or engraved into the top surface of the coating cylinder 44. The coating cylinder 44 rotates in coating material 50, e.g., polyvinyl alcohol with a zirconium crosslinking agent additive, contained in the coating bath 46. The coating material 50 is picked up by the thousands of recessed cells 48, and is deposited on the holographic paper 12 as it passes between the coating cylinder 44 and the impression cylinder 42. The impression cylinder 42 is covered with a rubber composition (not shown) that presses the holographic paper 12 into contact with the coating material 50 picked up by the cells 48 of the coating cylinder 44. Excess coating material is removed by a doctor blade 52 and returned to the coating bath 46. The doctor blade 52 also serves to regulate the thickness of the coating material 50 applied to the holographic paper 12.

A rotogravure coating station 40 is used to apply each layer of the ink jet printable coating 14, i.e., the primer layer 20, base coat layer 24 and porous layer 26. Though the method of applying the coating layers is shown via rotogravure, it will be clear to one skilled in the art that the primer layer 20 and base coat layer 24 can be applied by other methods well known in the art, e.g., meyer rod, slot die, multiroll, reverse roll, between the roll, or air knife methods. Critically, a rotogravure coating station used on the last layer, i.e., the porous layer 26, produces the microscopic pores 28 used as anchoring cites for the ink jet ink during the ink jet printing process.

Hot air dryers (not shown) are used between each station 40 to speed up the drying process of the coatings as applied. A ramped dryer (not shown), i.e., a dryer which provides a ramped rate of change of drying relative to line speed, is preferably used after the application of the base coat layer 24 of the secondary layer 22. This provides for a relatively thicker base coat layer 24 into which the ink jet ink can penetrate for relatively greater adhesion to the surface of the coating 14. That is, the deeper the base coat layer 24, the further the ink jet ink can penetrate when it is drying on the surface of the coating 14.

While preferred embodiments have been shown and described, various modifications and substitutions may be made thereto without departing from the spirit and scope of the invention. Accordingly, it is understood that the present invention has been described by way of illustrations and not limitations.

What is claimed is:

1. An ink jet printable optically variable medium comprising:

an optically variable device;

a primer layer disposed on the optically variable device, the primer layer being selected from the group consisting of acrylic resins, polyester resins, urethane resins, vinyl resins and nitrocellulose; and at least one secondary layer disposed on the primer layer, the secondary layer being selected from the group consisting of polyvinyl alcohol, gelatin, cellulose, acrylic resins and polyvinyl propylene and having a plurality of mechanically formed microscopic pores disposed thereon to provide sites for ink jet ink to anchor and set.

2. The medium of claim 1 wherein the ink jet ink further comprises a water based ink.

3. The medium of claim 1 wherein the microscopic pores are within the range of 1 microns to 6 microns in diameter.

4. The medium of claim 1 wherein the primer layer has a surface tension of at least 40 dyne.

5. The medium of claim 1 wherein the optically variable device comprises a holographic paper.

6. The medium of claim 1 wherein the optically variable device comprises a diffraction paper.

7. The medium of claim 1 further comprising a cap layer resistive to absorbing moisture disposed on the secondary layer.

8. The medium of claim 1 wherein the secondary layer comprises a zirconium crosslinking agent.

9. The medium of claim 1 wherein the secondary layer comprises:

a base coat layer disposed on the primer layer; and a porous coat disposed on the base coat layer, the porous coat having the plurality of microscopic pores disposed thereon.

10. A method of coating an ink jet printable optically variable medium with an ink jet printable coating comprising:

providing an optically variable device having an image with a variable appearance disposed thereon;

coating the optically variable device with a primer layer being selected from the group consisting of acrylic resins, polyester resins, urethane resins, vinyl resins and nitrocellulose;

coating the primer layer with at least one secondary layer being selected from the group consisting of polyvinyl alcohol, gelatin, cellulose, acrylic resins and polyvinyl propylene; and mechanically forming a plurality of microscopic pores on the secondary layer to provide sites for ink jet ink to anchor and set.

11. The method of claim 10 wherein coating the primer layer comprises coating via at least one of rotogravure, meyer rod and air knife.

12. The method of claim 10 comprising drying each layer between each coating.

13. The method of claim 12 wherein drying each layer comprises ramp drying at least one secondary layer.

14. The method of claim 10 wherein the microscopic pores are within the range of 1 microns to 6 microns in diameter.

15. The method of claim 10 wherein the primer layer has a surface tension of at least 40 dyne.

16. An optically variable medium comprising:

an optically variable device including, a substrate; and an optically variable portion disposed on the substrate, the optically variable portion having an image with a variable appearance; and a coating disposed on the optically variable device wherein the image appears therethrough, the coating comprising:

a primer layer disposed on the optically variable device, the primer layer being selected from the group consisting of acrylic resins, polyester resins, urethane resins, vinyl resins and nitrocellulose; and at least one secondary layer disposed on the primer layer, the secondary layer being selected from the group consisting of polyvinyl alcohol, gelatin, cellulose, acrylic resins and polyvinyl propylene and having a plurality of mechanically formed microscopic pores disposed thereon to provide sites for ink jet ink to anchor and set.

17. The optically variable medium of claim 16 further comprising a clay layer disposed between the substrate and the optically variable portion.

18. The optically variable medium of claim 16 wherein the microscopic pores are within the range of 1 microns to 6 microns in diameter.

19. The optically variable medium of claim 16 wherein the primer layer has a surface tension of at least 40 dyne.

20. The optically variable medium of claim 16 wherein the optically variable device comprises at least one of a holographic paper and a diffraction paper.

* * * * *